Figure 1:
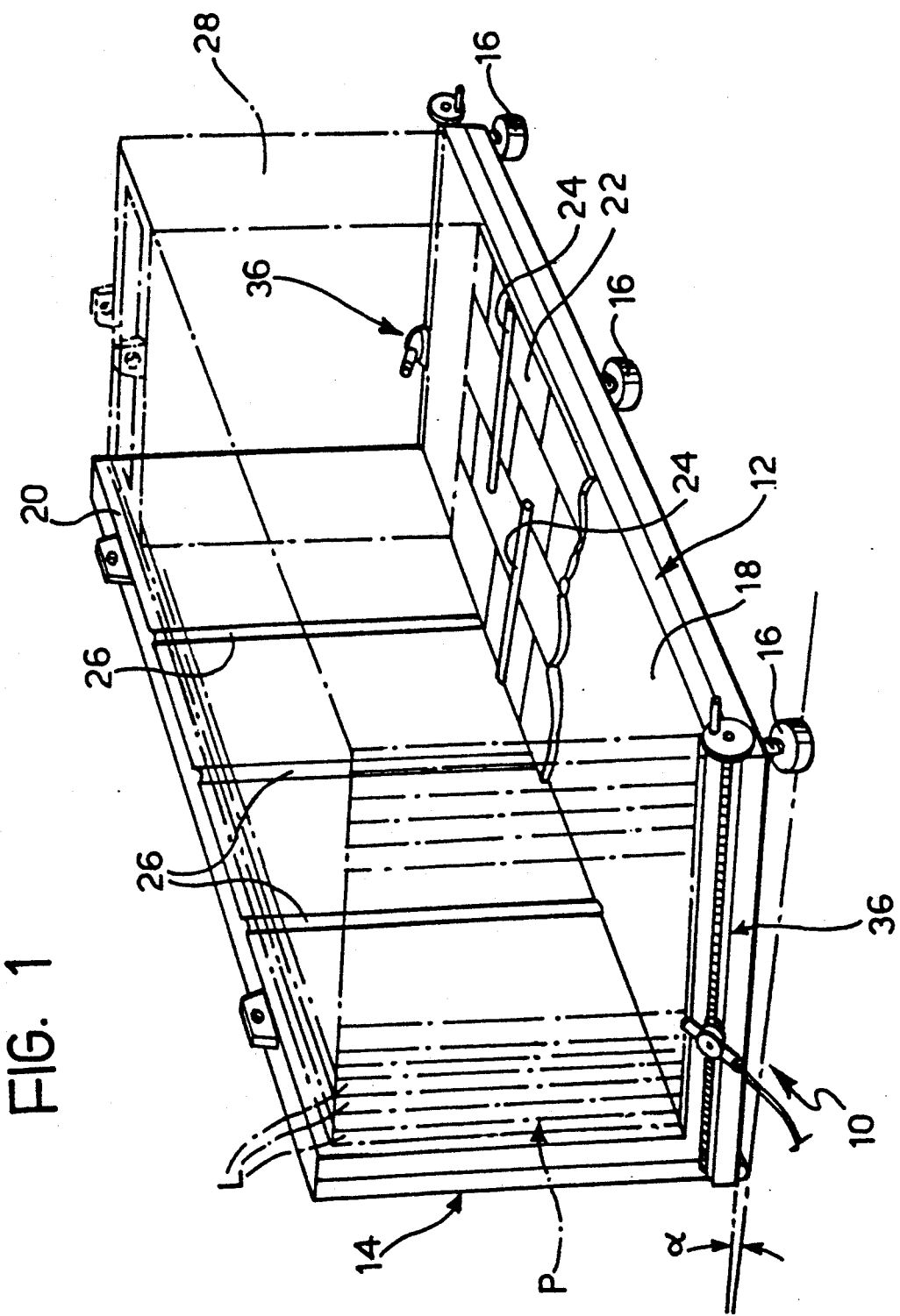

United States Patent [19]

Marocco

[11] Patent Number: 5,226,402

[45] Date of Patent: Jul. 13, 1993

[54] METHOD FOR THE PRODUCTION OF COMPOSITE PANELS BASED ON ORNAMENTAL STONE OR AN EQUIVALENT MATERIAL

[75] Inventor: Giuseppe Marocco, Turin, Italy

[73] Assignee: Tecnomaiera S.r.l., Turin, Italy

[21] Appl. No.: 560,671

[22] Filed: Jul. 31, 1990

[30] Foreign Application Priority Data

Nov. 30, 1989 [IT] Italy .................. 68062 A/89

[51] Int. Cl.$^5$ .................................... B28D 1/02
[52] U.S. Cl. ................... 125/12; 125/16.01; 125/23.01; 264/102
[58] Field of Search ........... 125/12, 16.01, 17, 23.01, 125/35; 264/102, 261, 271.1, 279.1

[56] References Cited

U.S. PATENT DOCUMENTS

| 393,201 | 11/1888 | Bailey | 125/16.01 |
|---|---|---|---|
| 1,349,955 | 8/1920 | Harwood | 125/12 |
| 3,265,056 | 8/1966 | Pieper et al. | 125/16.01 |
| 3,807,095 | 8/1974 | Harding et al. | 125/35 |
| 4,013,809 | 3/1977 | Marocco | 427/296 |
| 4,092,393 | 5/1978 | Marocco | 264/102 |
| 4,177,789 | 12/1979 | Marocco | 125/12 |
| 4,350,552 | 9/1982 | Bourke | 125/12 |
| 4,534,924 | 8/1985 | Kariakin | |
| 4,647,515 | 3/1987 | Russell | 264/279.1 |
| 4,686,251 | 8/1987 | Ostermann et al. | 264/271.1 |

FOREIGN PATENT DOCUMENTS

| 0252434 | 1/1988 | European Pat. Off. | |
|---|---|---|---|
| 2402311 | 7/1975 | Fed. Rep. of Germany | |
| 2833874 | 2/1979 | Fed. Rep. of Germany | 125/12 |
| 0903138 | 2/1982 | U.S.S.R. | 125/12 |

*Primary Examiner*—James G. Smith
*Attorney, Agent, or Firm*—Sughrue, Mion, Zinn, Macpeak & Seas

[57] ABSTRACT

In a first step of the method, a pack of slabs is formed by positioning successive layers constituted by ornamental slabs of stone or equivalent material alternating with supplementary layers constituted by slabs or sheets in succession on a support base. A liquid-tight container is then formed around the pack. A peripheral space is left in the container at least around the edges of the layers of the pack. The interior of the container is then subjected to a vacuum and a settable fluid binder, such as a thermosetting synthetic resin, is introduced into the container while it is under vacuum so that the binder fills the whole of the peripheral space, penetrates the gaps between the slabs, and covers the pack of slabs. The vacuum is then released to complete the penetration of the binder and the binder is left, or made, to set so as to produce a consolidated pack of slabs in a block in which the faces of the block corresponding to the edges of the layers are covered by a hermetic covering of binder. The block thus produced is then subjected to final multiple cutting along intermediate planes of some layers to produce one or more composite panels from each zone between two consecutive cuts.

32 Claims, 5 Drawing Sheets

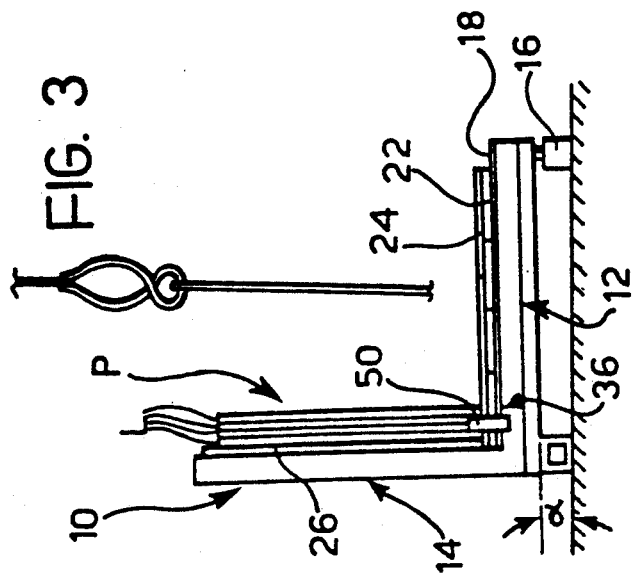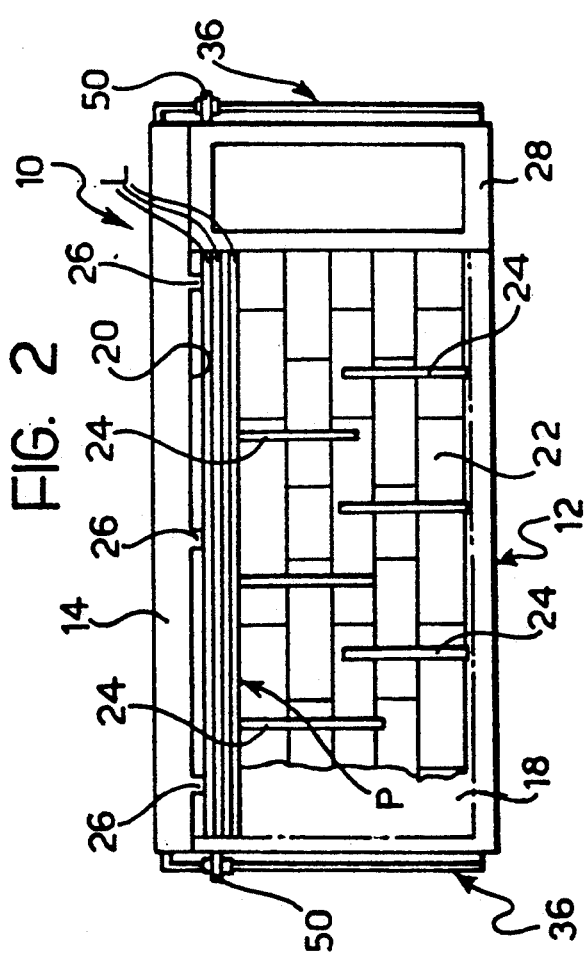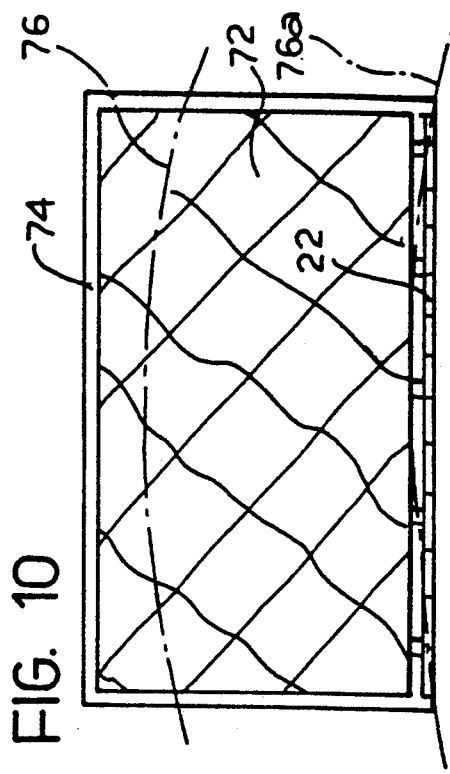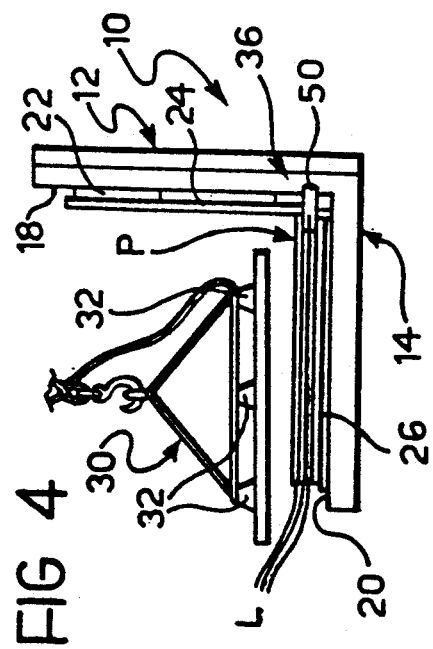

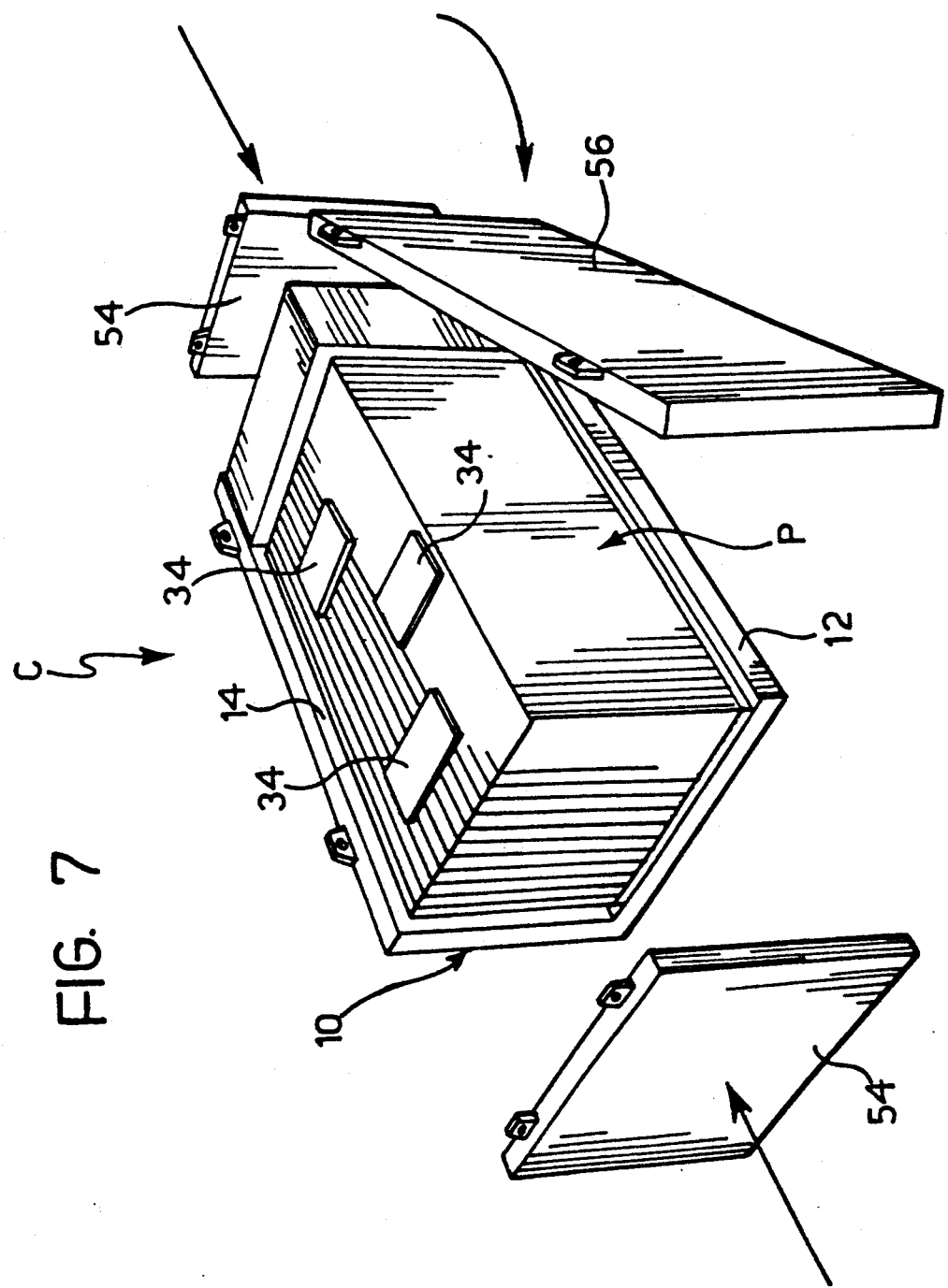

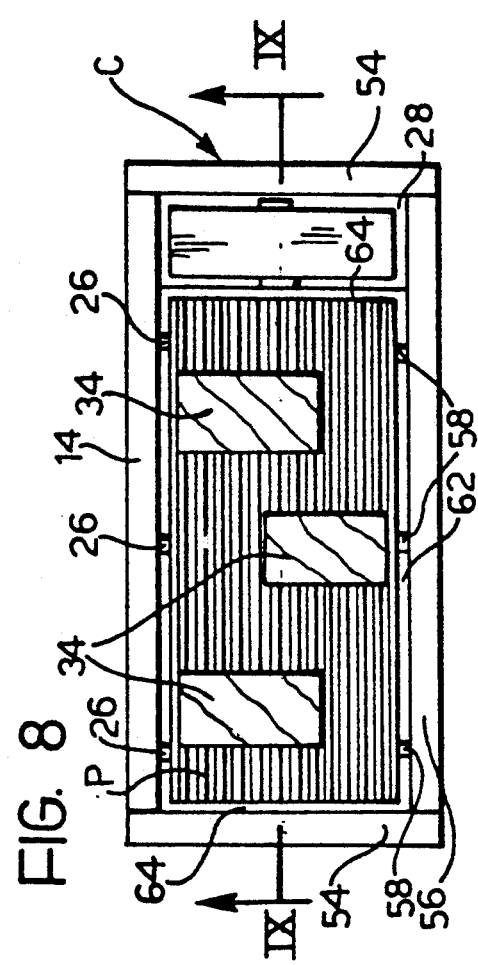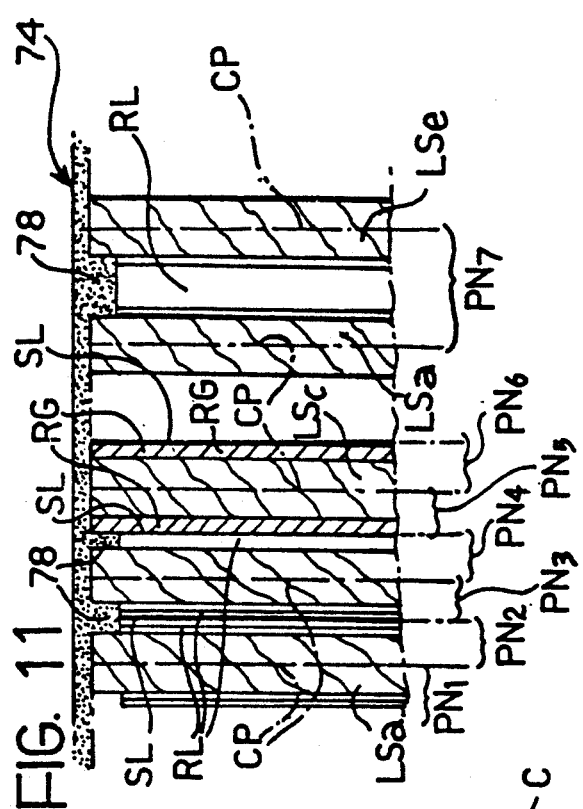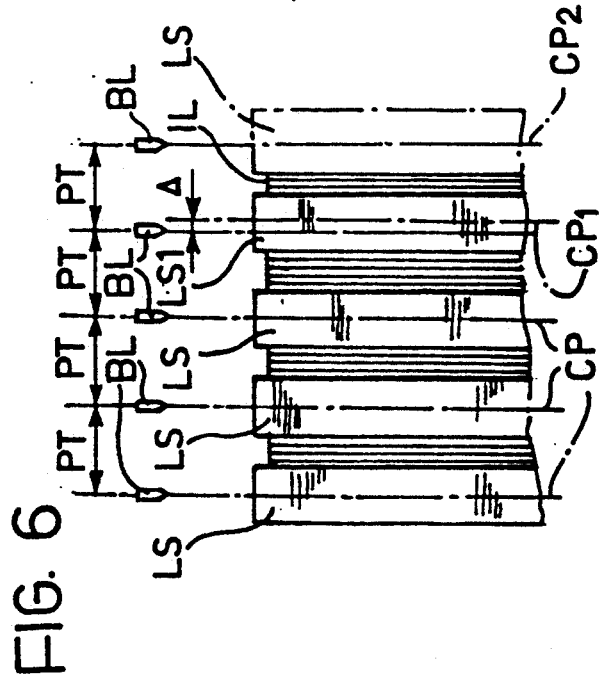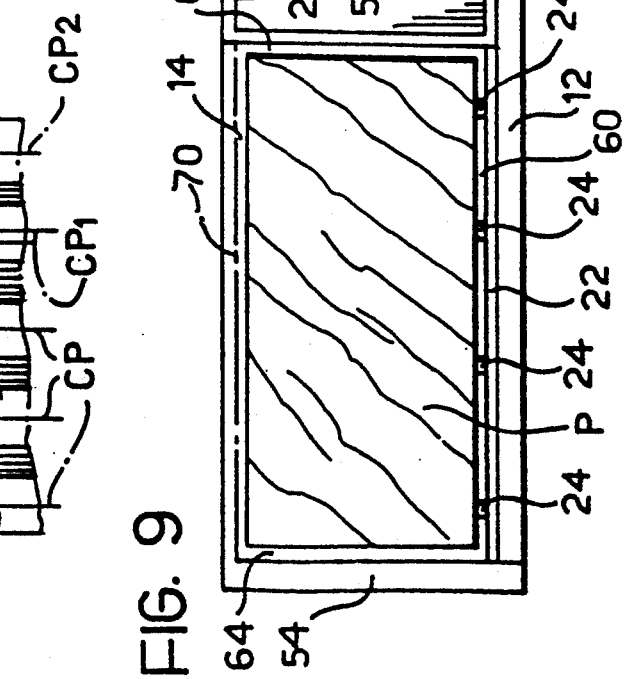

METHOD FOR THE PRODUCTION OF COMPOSITE PANELS BASED ON ORNAMENTAL STONE OR AN EQUIVALENT MATERIAL

The present invention relates to a method for the production of composite panels based on ornamental stone or an equivalent material in flat slabs, of the type comprising the successive steps of composing a pack of slabs, enclosing the pack of slabs in a liquid-tight container, subjecting the interior of the container to a vacuum, introducing a settable fluid binder into the container whilst it is under vacuum so that the binder penetrates the gaps between the slabs and covers the pack of slabs, releasing the vacuum in order to complete the penetration of the binder, leaving or causing the binder to set so as to produce a consolidated pack of slabs in a block, removing the block from the container, and finally subjecting the block to multiple cutting to produce the panels.

A known method which constitutes the prior art closest to the invention is described and illustrated in U.S. Pat. No. 4,092,393.

In an embodiment of this known method, a pack of flat slabs of marble or other ornamental stone is formed. The consolidated block obtained therefrom is subjected to multiple cutting perpendicular to the planes of the slabs to produce composite slabs having geometrical patterns determined by the contrast between the different types of starting slabs.

The object of the present invention is to apply the principles of this known method to the production of composite panels of many different kinds starting from ready-cut slabs of different stone materials, sheets of reinforcing materials, etc.

According to the invention, this object is achieved by a method wherein the pack is formed by positioning successive layers constituted by ornamental slabs of stone or equivalent material alternating with supplementary layers constituted by slabs or sheets in succession on a support base, the container is formed around the pack carried by the support so that a peripheral space is left in the container at least around the edges of the layers of the pack, the fluid binder is introduced into the container so that the binder completely fills the peripheral space and, after setting, constitutes a hermetic covering over the faces of the block corresponding to the edges of the layers, and the final multiple cutting of the block is carried out along the intermediate planes of some layers in order to produce the panels.

The method according to the invention is suitable for the formation of panels including any type of stone but particularly granite slabs.

Pending U.S. patent application Ser. No. 458,693 describes and illustrates a method in which reinforced panels are produced by the cutting or sawing of a block of construction material such as stone. It is difficult to produce panels incorporating granite slabs by this method.

In the method of application Ser. No. 458,693, one starts with a block which is subjected to multiple cutting. The size and shape of the block must be compatible with the dimensions of a form. In the case of marble, the block can easily be squared off if it does not have this size or shape. With granite, however, this is not possible at a reasonable cost. The squaring of granite blocks is an unusual operation in normal practice. The granite block is usually sawn without being squared so that slabs of very varied dimensions are obtained.

The method of the invention enables the pack to be formed with the use of slabs of substantially the same size, after this size has been selected from the various sizes available.

A method for the production of composite panels each including a layer of stone and a reinforcing layer which in turn is composite is known from European Patent Application No. 252,434.

In order to make these panels, composite elements are formed, each including two opposite outer layers of stone and/or interposed reinforcing layers. These elements are combined in a pack with the interposition of spacers and the spaces between the elements are at least partly filled with a filler material. The pack thus produced is clamped in a press and sawn along the median planes of the stone slabs.

Amongst other things, this known method has the disadvantage that it does not allow the best use to be made of the space occupied by the pack, given the presence of the spaces containing the filler material which is to be discarded. Moreover, it does not permit the improvement of the stone by in-depth impregnation.

Figure 5:
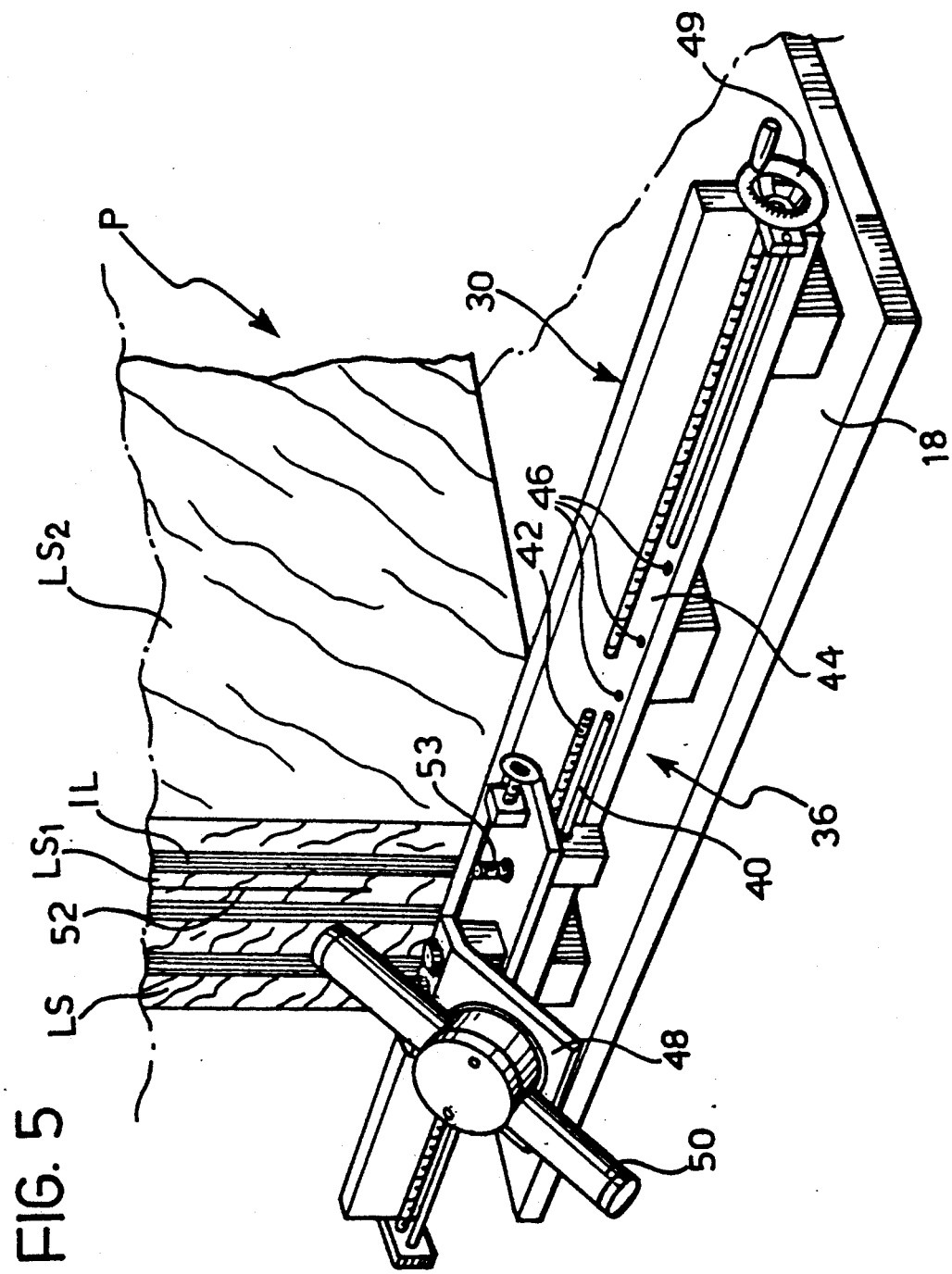

Further characteristics and advantages of the invention will be understood better from a reading of the detailed description which follows with reference to the appended drawings, provided purely by way of non-limiting example, in which:

FIG. 1 is a perspective view of a support structure during preparation for the formation of a pack of slabs or layers, according to a first embodiment, FIGS. 2 and 3 respectively are a plan view and a side view of the same structure during the formation of a pack of layers, FIG. 4 is a side view corresponding to FIG. 3 but showing another embodiment of the structure, FIG. 5 is a detailed perspective view showing a system for detecting the positions of the slabs during the formation of the pack in order to position the cutting planes correctly, FIG. 6 is a schematic representation of the positioning procedure achieved with the aid of the system of FIG. 5.

FIG. 7 is a perspective view showing the various elements of a container during its formation around the pack of layers, FIG. 8 is a plan view of the container formed around the block, and of the block itself, from above, FIG. 9 is a longitudinal section taken on the line IX—IX of FIG. 8, FIG. 10 is a section corresponding to FIG. 9 of the consolidated block alone, and FIG. 11 is a partial section taken transverse the slabs of the block, showing some of the various kinds of composite panels which can be obtained by the method according to the invention.

With reference to FIGS. 1 to 3, a strong metal support structure is generally indicated 10. The structure 10 includes a base wall 12 and a side wall 14 fixed firmly together and arranged at right angles.

In order to form a pack of layers or slabs, as will be described further below, the two walls 12 and 14 are preferably inclined at a certain angle alpha of a few degrees, for example, with the use of hydraulic jacks 16.

The base wall 12 has a flat load-bearing surface 18. The side wall 14 also has a flat surface 20 at the side of the surface 18.

In preparation for the formation of a pack of layers on the support structure 10, the load-bearing surface 18 is preferably covered with a flooring 22 of reject slabs of marble or other stone, for the purpose which will be explained below.

Spacer elements 24, preferably in the form of strips of wood or other material, are positioned in a staggered arrangement on the flooring 22, for the purpose which will be explained below.

Further spacer elements in the form of strips 26 are formed on or applied to the surface 20 of the side wall 14, again for a purpose which will be explained below.

Once the operations described above have been carried out, a pack P of layers of slabs L is built up, starting from the side wall 14 with the first slab L resting against the spacer strips 26. The formation of a tight pack is facilitated and maintained by the downward inclination of the load-bearing surface 18 towards the side wall 14 and by the outward inclination of the surface 20 of the latter.

A support structure such as that indicated 10 is preferably of such a size that it can hold slabs of the longest length available commercially. For example, it may be arranged to hold slabs 3.50 m long by 1.55 m wide.

If the pack P is composed of shorter slabs, it is envisaged that a box-shaped filler element 28 will be used to fill up the space not occupied by the pack P in the container, as will be mentioned further below. The support structure 10 may be provided with an assortment of boxes 28 of different dimensions for use in dependence on the lengths of the slabs.

FIG. 4 shows the same support structure 10 tilted through 90° with respect to FIG. 3, its parts being indicated by the same reference numerals as in the preceding drawings. The support structure 10 may be tilted manually or by any notable mechanical apparatus depending upon the overall size and weight.

In the embodiment of FIG. 4, the pack is formed by laying successive layers or slabs L flat on top of one another, starting from the base wall 14 or rather from its spacer elements 26.

To advantage, the layers, or at least the heavier slabs L, are positioned by apparatus 30 with suction cups 32.

In the embodiment of FIG. 4, the two walls 12 and 14 are preferably also inclined similar to the inclination in FIG. 3 so as to ensure that the successive slabs L abut the spacer strips 24 of the side wall 12 which are applied in turn to a covering of tiles or slabs 22.

After the pack P has been formed, the structure 10 of FIG. 4 is tilted to the position of FIG. 3 for the pouring of the binder which will be mentioned further below.

With reference again to the embodiment of FIGS. 1 to 3, during the formation of the pack P, reinforcing ties, indicated 34 in FIGS. 7 and 8, are preferably glued to its upper face at intervals. These ties may simply consist of reject slabs of marble or other material glued to the slabs during the formation of the pack. Alternatively, the ties could consist of U-shaped metal brackets arranged astride two or more consecutive stone slabs.

A convenient system for the correct positioning of the slabs of the pack will now be described with reference to FIGS. 5 and 6.

FIGS. 1 and 2 show schematically two devices, indicated 36, which are fixed along the two opposite ends of the lower wall 12 during the formation of the pack P.

Each device 36 comprises an elongate frame 38 which carries a guide rod 40 and a threaded rod 42 parallel to the former. The device 36 is arranged such that the two rods 40 and 42 extend parallel to the direction in which the pack P of slabs L is built up. The rod 40 has been partially broken away in FIG. 5 for the purpose of showing the holes 46.

The frame 38 also includes a strip 44 which is parallel to the rods and acts as a fixed scale. The graduations of the scale are constituted by holes 46 formed in the strip 44. The spacing of the graduations or holes 46 will be mentioned further below.

A carriage 48 is slidable on the two rods 40 and 42 and has a female thread (not shown) which is engaged on the threaded rod 42. The rotation of a wheel 49 causes the carriage 48 to slide along the guides constituted by the rods 40 and 42.

The carriage 48 carries a laser gun 50 which projects a laser beam so as to form a line of light 52 substantially parallel to the corresponding edges of the slabs L.

By way of example, a peg 53 is mounted on the carriage 48 for snap-engagement in successive holes 46.

With reference to FIG. 6, the holes 46 are arranged at the cutting pitch PT of a multiple cutting frame whose cutting members (blades, diamond wires, or the like) are indicated BL. The spaces PT between one blade and another may differ and are arranged according to the cuts to be made in the block which is produced from the pack of layers P and which will be mentioned further below.

The cutting planes which must correspond precisely to the positions of the blades BL during the final multiple cutting are indicated CP in FIG. 6. These cutting planes CP will be in slabs LS which form parts of the pack and between which are interposed one or more intermediate layers IL having reinforcing or other functions in the composite panels to be produced.

It is assumed that the formation of the pack has reached the stage of the positioning of a slab $LS_1$ in which a cut is envisaged along a median cutting plane $CP_1$. The slab $LS_1$ may be of stone or another material, for example asbestos cement, as will be seen below.

When the operator has positioned the slab $LS_1$ (FIGS. 5 and 6), he moves the carriage 48 with the aid of the wheel 49 so that the peg 53 is engaged in the hole 46 which corresponds to that slab. The gun 50 thus projects a line of light 52 onto the slab $LS_1$. If the line of light 52 is offset from the envisaged or desired cutting plane $CP_1$, for example, by an error of a magnitude delta as shown in FIG. 6, the operator takes account of or compensates for this difference delta in the positioning of a subsequent slab $LS_2$ to be cut along a cutting plane $CP_2$. It should be noted that the positioning errors delta from one slab to the next are generally negligible (of the order of 1 mm) in comparison with the overall thickness of a slab such as $LS_1$ (of the order of 4–5 cm) so that one cutting error in either direction from the envisaged or desired cutting plane $CP_1$ is of little importance.

The operator must bear in mind that the error delta has to be compensated for in the next slab $LS_2$ to be cut. In order to compensate for the error, the operator selects, from an available stock, one or more intermediate layers IL or shim sheets provided for in the composition of the pack and having a thickness such as to compensate, in the next intermediate cutting plane $CP_2$, for the error found in the preceding cutting plane $CP_1$. The shim sheets or layers selected may be intended to form part of a corresponding final composite panel or, as will be seen, may be expendable separating layers.

The use of a line of laser light 52 serves not only to check whether or not a cutting plane such as $CP_1$ corresponds to the envisaged or desired cutting position but also to check that a slab such as $LS_1$ is parallel to the previously positioned layers of the pack so that it may be made parallel if necessary. The checking may be done at the two ends of the slabs, preferably with the use of two detection devices, as indicated 36 again in FIGS. 1 and 2.

The devices 36 are removed before the formation of a casting container which will now be described.

With reference to FIGS. 7 to 9, the structure 10 is used as part of a container for the casting of a fluid binder, as will be described below.

The container, generally indicated C, is generally in the shape of a box which is open at the top. Its base wall and one of its side walls are constituted by the base wall 12 and the side wall 14 of the structure 10, respectively. The other walls of the container consist of two end walls 54 and a second side wall 56. These three walls 54 and 56 are bolted to the edges of the walls 12 and 14 and to each other or are connected by some other rigid clamping system (not shown) with the interposition of sealing strips (not shown). Preferably, the side wall 56 also includes strips or other spacer elements 58 (FIG. 8) similar to the strips 26.

The filler element 28, if used, is left in the container or box C beside one end wall 54 to prevent the undesirable filling of that space by the binding material.

As can be seen in FIGS. 7 to 9, a peripheral space remains between the pack P and all the walls of the container 50. In particular, there is a region 60 of the peripheral space between the flooring 24 and the lower face of the pack P and there are lateral regions 62 of the space between the pack and the side walls 14 and 56. There are also regions 64 and 66 of the space between the filler element 28 and the respective end wall 54. These regions 64 and 66 of the peripheral space are formed simply by the careful and correct centring of successive slabs of the pack P.

The box C and the pack P contained therein are subjected to an impregnation operation according to the teaching of U.S. Pat. No. 4,013,809, to which reference should be made.

In particular, the unit constituted by the container and the pack is first of all subjected to a step of drying and preheating in order to remove any water impregnating the material of the pack P.

Preferably, however, the drying and preheating step is carried out on the stone slabs before the pack P is formed.

In this case, it may be necessary to heat the pack P if the impregnation, to which further reference will be made below, is carried out several hours after the formation of the pack, for example, on the following day.

The impregnation is carried out in an autoclave according to the teaching of U.S. Pat. Nos. 4,013,809 and 4,092,393, to which reference should be made for all the details.

For simplicity, the term "resin" will be used in the following description to indicate any suitable, settable fluid product. Two-part, so-called thermosetting synthetic resins (epoxy, polyester and other resins) are preferred, however.

In any case, it is envisaged that the impregnating resin will have the characteristic of setting within a longer or shorter time period by internal chemical transformation which, upon completion, causes it:

to adhere strongly to all the walls of the space occupied except for the not-stick layers which will be mentioned;

to acquire a mechanical strength substantially comparable to that of the stone or other material with which it is in contact.

According to a preferred embodiment, the impregnating resin is introduced into the box C, as in U.S. Pat. No. 4,092,393 by pouring from above through a suitable distribution system, under a high vacuum. With this method, the layers of the pack P are dried further still and the liquid resin is degassed at the moment of introduction.

During the pouring, the resin spreads into all the gaps between the individual slabs L of the pack, descends in the peripheral space through its side regions 62, 64, 66 and, after it has spread into the lower space 60 along the labyrinthine path defined by the strips 24, rises into the gaps between the slabs L to impregnate them completely.

The introduction of the impregnating liquid is stopped when the pack P is submerged under a head of several centimeters of liquid, as shown at 70 in FIG. 9.

According to a variant, the same container in which the pack P is situated may be closed hermetically by means of a lid (not shown) so as to act as an autoclave.

If the stone is so compact as not to necessitate the penetration of the resin into small spaces in the heart of the material (deep penetration) and if the other sheets or slabs provided, as mentioned further below, are of a type and shape such as to enable the whole surface to be wetted well at the stage of introduction of the resin filler, the actual impregnation of the materials may not be necessary.

In most cases, however, these conditions do not occur since stone inevitably has some defects, spaces, etc., so that actual impregnation is necessary. This impregnation is achieved, according to the teaching of U.S. Pat. No. 4,013,809, by the application in the autoclave (and/or in the hermetic container) of an overpressure which acts on the liquid resin before it sets and forces it to occupy all the cavities (spaces, cracks and other defects) in the stone and possibly in the other layers.

As described in U.S. Pat. No. 4,013,809, the overpressure may consist simply of the return of the interior of the autoclave or container to atmospheric pressure, resulting in a differential pressure on the free surface of the resin.

Once the resin or other binder has set, a composite block 72, as shown in FIG. 10, is obtained, in which all the gaps between the layers and all the spaces or cavities in the individual layers have been filled with resin. Moreover, the block 72 is completely encapsulated in a layer 74 of set resin or other binder which seals its interior. The various layers within the block 72 are thus kept firmly stuck together, not only by the resin which binds them but also by the atmospheric pressure around the envelope 74. This is particularly useful, above all, when there are non-stick layers in the block 72, as will be seen below.

The advantages of the flooring 22 shown in FIG. 1 will now be explained with reference to FIG. 10. This flooring remains bound to the lower face of the block 72, which will be cut last during the multiple cutting process, by the resin or other binder.

Particularly in the case of granite, the cutting is carried out by means of blades which wear out quickly.

The blades wear more at their centres than their ends, so that they assume an arcuate shape, as shown at 76 in FIG. 10. It is thus desirable that, when a blade reaches a condition such as that indicated 76a in FIG. 10 towards the end of the cut, its ends still find a material similar to that of the block to cut or saw below the block 72. The flooring 22 in fact constitutes this material and is sawn partially at the ends whilst the centres of the blades complete the cutting or sawing of the centre of the block 72.

The flooring 22 incorporated in the block 72 also constitutes a base for the block and protects its lower face during handling.

Some of the various possible compositions of the pack P and the panels which can be produced therefrom will now be described with reference to FIG. 11.

In FIG. 11, the envelope or capsule of resin or other binder is again indicated 74. The cutting planes are again indicated CP. The slabs to be cut along the planes CP are indicated by the reference letters LS followed by suffix letters.

The panels to be produced by the cutting along the planes CP are indicated by the letters PN followed by suffix numerals.

Reinforcing layers of various kinds are indicated RL. Certain reinforcing layers, which will be mentioned further, are indicated RG. Separating layers are indicated SL.

The separating layers SL may consist of thin, rigid or flexible sheets of a material, such as a sheet of polyethylene, having the property that it does not stick to the resin or other binder. Alternatively, the separating layers SL may be actual layers of a non-stick material, such as silicone oil, spread on the mating faces of the two adjacent slabs or sheets. The separating layers SL may also be disposed, for example glued, on one or other of the faces of the adjacent layer.

The reinforcing layers RL may be constituted by sheets or slabs of a solid material which is intended to remain joined to a layer of ornamental material, such as LS, in a final composite panel, such as those indicated PN. For example, a reinforcing layer may be constituted by a fibrous material, such as glass fibre, by a piece of sheet metal, perhaps perforated, or by a mesh of metal or other material. Other materials for the reinforcing layers may be fabrics or mats of glass fibres or the like, or laminated plastics sheets. The use of asbestos cement for the reinforcing layers is also envisaged. In this case, the slabs such as LS may be of asbestos cement and may be intended to be cut along the planes CP.

In one particular case, a reinforcing layer may be constituted by a sheet of glass RG.

Preferably, as shown in FIG. 11, the layers, such as RL and SL, which are not intended to be cut are of such a size that their edges are recessed from the upper face of the block B. Gaps are thus formed between the tops of the slabs LS which are intended to be cut and are filled by bridges 78 of set binder. This measure is particularly useful when the slabs LS to be cut are of granite. In this case, the cutting is carried out from the upper face of the block B with the aid of abrasive metallic grit. Without the bridges 78, the grit, which covers the whole upper face of the block, would erode the top edges of the layers such as RL and SL with a disastrous "breaking of the vacuum" which keeps the separating layers SL and the adjacent layers together during the cutting along the planes CP.

Separation is carried out, however, in order to obtain the individual panels PN after the cutting or sawing of the block B along the planes CP and after the removal of the envelope of binding material 74.

Still with reference to FIG. 11, two panels such as $PN_1$ and $PN_2$, produced by cutting through the middle of the slab $LS_a$ and separating the rest of the block B by virtue of the non-stick layer SL, may each include a layer of stone and one or more reinforcing layers RL of one or more of the aforesaid materials. Panels such as $PN_3$ and $PN_4$, produced by separation in the same way, may include a different stone.

Two panels such as $PN_5$ and $PN_6$ may each include a layer of marble produced by cutting through the middle of the slab $LS_c$ the visible surface of which is covered by a respective transparent layer of glass RG. Sheets of this type were previously produced by a fairly complex method described and illustrated in U.S. Pat. No. 4,460,850. According to this method, a transparent sheet of glass was fixed to a stone slab by means of a sheet of polyvinyl butyral.

A panel $PN_7$ may include a pair of slabs $LS_d$ and $LS_e$ of stone, or a slab of stone and one of asbestos cement, joined together permanently with the interposition of one or more reinforcing layers RL of one or more of the types mentioned above. Reference should be made to U.S. application Ser. No. 458,693 for other possible compositions of the composite panels.

I claim:

1. In a method for the production of composite panels based on ornamental stone or an equivalent material in flat slabs, of the type comprising the successive steps of composing a pack of slabs, enclosing the pack of slabs in a liquid-tight container, subjecting the interior of the container to a vacuum, introducing a settable fluid binder into the container whilst it is under vacuum so that the binder penetrates the gaps between the slabs and covers the pack of slabs, releasing the vacuum in order to complete the penetration of the binder, leaving or causing the binder to set so as to produce a consolidated pack of slabs in a block, removing the block from the container, and finally subjecting the block to multiple cutting to produce the panels, improvement wherein the pack is formed by positioning successive layers constituted by ornamental slabs of stone or equivalent material alternating with supplementary layers constituted by slabs or sheets in succession on a support base, the container is formed around the pack carried by the support so that a peripheral space is left in the container at least around the edges of the layers of the pack, the fluid binder is introduced into the container so that the binder completely fills the peripheral space and, after setting, constitutes a hermetic covering over the faces of the block corresponding to the edges of the layers, and the final multiple cutting of the block is carried out along the intermediate planes of some layers in order to produce the panels.

2. The method as claimed in claim 1, wherein a peripheral space is left all around the pack in the container so as to produce a block completely enclosed by a capsule of the set binder.

3. The method as claimed in claim 1, wherein the pack of slabs is formed by placing the successive layers side by side on end, in upright positions.

4. The method as claimed in claim 3, wherein a substantially horizontal, flat, load-bearing surface is used as the support base, spacer elements are formed on or applied to the surface, and the ends of the layers are positioned in turn on the spacers so that a lower region of the peripheral space is defined between the flat surface and a lower face of the pack.

5. The method as claimed in claim 4, wherein a structure is used to form the pack and comprises two walls arranged at right angles, one of which is at the bottom and has the load-bearing surface constituting the base of the container and the other of which is at the side, constitutes one of the side walls of the container, and has a flat face facing the pack.

6. The method as claimed in claim 3, wherein, in order to form the pack, the structure is arranged with its bottom wall inclined towards the side wall and its side wall inclined outwardly and the pack is formed starting with a first layer which is placed against the side wall.

7. The method as claimed in claim 5, wherein spacer elements are formed on or applied to the surface of the side wall which faces the pack so as to define a side region of the peripheral space between that surface and the adjacent layer of the pack.

8. The method as claimed in claim 4, wherein a flooring of slabs, tiles or similar elements is placed on the flat load-bearing surface and the spacer elements in turn are positioned on the flooring so that, as a result of the binding of the flooring by the set binder, they form therewith a base for the block.

9. The method as claimed in claim 1, wherein the pack of layers is formed by laying the successive layers flat on top of one another on a flat, substantially horizontal bearing surface, and the pack formed is then tilted substantially through 90° for the pouring of the binder.

10. The method as claimed in claim 9, wherein a structure is used to form the pack and comprises two walls arranged at right angles, one of which is at the bottom and has the load-bearing surface constituting the base of the container and the other of which is at the side, constitutes one of the side walls of the container, and has a flat face facing the pack, the structure being pivoted substantially through 90° for the formation of the pack and tilted to return it to the position of claim 5 for the pouring of the binder.

11. The method as claimed in claim 1, particularly for the cutting of a block with multiple cutting members wherein the cutting is carried out with the aid of abrasive metallic grit from an upper face of the block, and wherein the layers which are not intended to be cut are of such a size that their edges are recessed from the upper face of the block so that gaps which are intended to be filled by bridges of set binder are formed above these edges.

12. The method as claimed in claim 1, wherein the binder is a thermosetting synthetic resin.

13. The method as claimed in claim 1, wherein, for the multiple cutting of the block, corresponding cutting members are spaced at intervals equal to intervals between desired intermediate cutting planes and, during forming of the pack, after positioning of each successive layer in which a cut is required, an actual position of an intermediate cutting plane relative to a reference position is detected and, if the actual position differs from the desired intermediate cutting plane, one or more shim sheets provided for in the composition of the pack and having a thickness such as to compensate in a subsequent intermediate cutting plane for an error found in a preceding cutting plane are used between the layer and a successive layer.

14. The method as claimed in claim 13, wherein the actual position of each cutting plane is determined by means of an index which is movable in the direction in which the pack is formed and is moved along a fixed scale which carries graduations corresponding to the positions of the desired cutting planes.

15. The method as claimed in claim 14, wherein a laser beam projected from laser generating means so as to form a line of light substantially parallel to the edges of the slabs is used as the index.

16. The method as claimed in claim 14, wherein the actual position of each intermediate cutting plane is determined by means of two scale units situated on opposite sides of the pack during formation of the pack and index means movable along said scale unit to locate each actual position.

17. The method as claimed in claim 1, wherein a solid reinforcing material which is intended to remain joined to at least one layer of ornamental material in the final composite panel is used to form some layers of the pack.

18. The method as claimed in claim 1, wherein separator layers are used at intervals to form some layers of the pack and have the property that they do not stick to the binder so as to facilitate the separation of adjacent composite panels after multiple cutting.

19. The method as claimed in claim 17, wherein a fibrous material such as glass fibre is used as the solid reinforcing material.

20. The method as claimed in claim 17, wherein the reinforcing material is sheet metal.

21. The method as claimed in claim 20, wherein the sheet metal is perforated.

22. The method as claimed in claim 17, wherein the reinforcing material is a mesh.

23. The method as claimed in claim 17, wherein the reinforcing material is a fabric or mat of glass fibre or the like.

24. The method as claimed in claim 17, wherein the reinforcing material is a plastics laminate.

25. The method as claimed in claim 17, wherein the reinforcing material is asbestos cement.

26. The method as claimed in claim 18, wherein at least one reinforcing sheet and the aforesaid non-stick layer are inserted in the pack between two ornamental slabs.

27. The method as claimed in claim 26, wherein one or more reinforcing sheets or slabs with the non-stick layer interposed are inserted between two ornamental slabs during the formation of the pack.

28. The method as claimed in claim 26, wherein the non-stick layer is constituted by a sheet material.

29. The method as claimed in claim 28, wherein the sheet material constituting the non-stick layer is a flexible material.

30. The method as claimed in claim 28, wherein the non-stick sheet material is in the form of a substantially rigid sheet.

31. The method as claimed in claim 26, wherein the non-stick layer is a fluid product which is spread on a reinforcing sheet or slab beforehand.

32. The method as claimed in claim 26, wherein reinforcing sheets constituted by glass plates are used and, during the formation of the pack, are applied directly to a face of an ornamental slab which is intended to remain visible.

* * * * *